W. H. CRANE.
ANTISKID DEVICE FOR VEHICLE WHEELS.
APPLICATION FILED APR. 13, 1920.

1,398,538.

Patented Nov. 29, 1921.

Inventor:
W. H. Crane
by Rogers, Kennedy & Campbell
Attys.

W. H. CRANE.
ANTISKID DEVICE FOR VEHICLE WHEELS.
APPLICATION FILED APR. 13, 1920.

1,398,538.

Patented Nov. 29, 1921.
2 SHEETS—SHEET 2.

Inventor:
W. H. Crane
by Rogers, Kennedy Campbell Attys.

UNITED STATES PATENT OFFICE.

WILLIAM H. CRANE, OF DAVENPORT, IOWA.

ANTISKID DEVICE FOR VEHICLE-WHEELS.

1,398,538. Specification of Letters Patent. Patented Nov. 29, 1921.

Application filed April 13, 1920. Serial No. 373,553.

*To all whom it may concern:*

Be it known that I, WILLIAM H. CRANE, a citizen of the United States, residing at Davenport, in the county of Scott and State of Iowa, have invented certain new and useful Improvements in Antiskid Devices for Vehicle-Wheels, of which the following is a specification, reference being had therein to the accompanying drawing.

This invention relates to antiskid devices for vehicle wheels and has reference more particularly to that type of device comprising a clamp to be applied to the wheel spoke, and a connected gripping element, usually in the form of a section of chain, which passes across the tread of the wheel tire.

The aim of my invention is to produce a device of this character which will be composed of a few parts, can be adjusted for spokes of different diameters and tires of different sizes, and be readily and speedily applied to the wheel, and which when applied to the wheel will retain its proper position and be effective and reliable in action; and the invention consists of certain improved features of construction and arrangement of parts which will be fully described in the specification to follow and the novel parts of which will be pointed out in the appended claims.

In the accompanying drawings—

Figure 1:
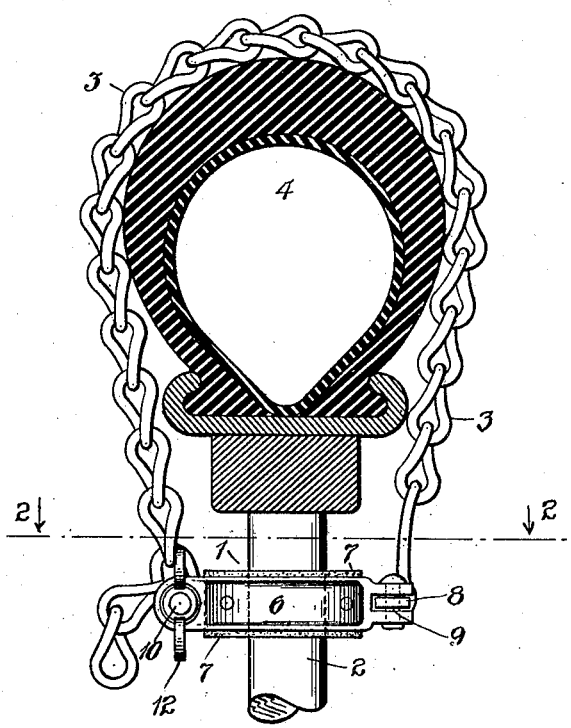
Figure 1 is a cross section through a wheel tire having my improved antiskid device applied thereto.

My improved device comprises a clamp 1 adapted to be applied to the wheel spoke 2, and a gripping element 3, in the present instance in the form of a section of chain adapted to extend over and across the wheel tire 4 and having its ends fastened to the clamp.

In accordance with my invention the clamp consists of two opposing clamping jaws 5 and 6 adapted to clamp the spoke between them and preferably provided, where they engage the spoke, with facings 7 of felt or similar yielding material. One of the jaws, in the present instance the jaw 5, is provided at one end with a relatively fixed lateral extension 8 to the end of which the corresponding end of the other jaw is pivoted as at 9, so that the two jaws are permanently pivoted together and may be swung apart to admit the spoke between them, and then closed on the spoke to fasten the clamp in position. The jaws are clamped on the spoke to thus fasten the clamp, by means of a clamping bolt 10 which is movably engaged with the end of the jaw 6 and is adapted to be detachably engaged with the end of the other jaw, the said bolt being adjustable to enable the clamp to be applied to spokes of different sizes. This construction is shown best in Fig. 2 where it will be seen that the jaw 6 is provided with a hole 11 in its free end extending therethrough in which hole the bolt 10 extends loosely and freely, the said bolt being threaded to receive a wing nut 12 which when screwed up will bear against the outer side of the jaw. The opposing jaw 5 is provided in its free end with an open slot 13 to receive the bolt, and the latter is provided on its end with a head 14, which when the bolt is engaged in the slot, will bear against the outer side of the jaw. The size of the hole 11 in relation to the diameter of the bolt is such that the bolt can be rocked in the hole to such an outward inclined position, as shown by dotted lines in Fig. 2, that the jaws of the clamp can be closed on the spoke without interference with the bolt, and when so closed the bolt is rocked back and entered in the slot in the jaw, and then by turning up the nut, the jaws will be caused to close on and firmly grip the spoke between them.

The gripping chain 3 is permanently connected at one end to the lateral extension 8 of the jaw 5, which extension passes through the end closed link of the chain and the opposite end of the chain is adapted to be detachably connected to the clamping bolt, which latter, when the clamp is applied to the spoke, is passed through one of the chain links before the bolt is engaged with the slotted jaw.

From the foregoing description it will be understood that the two jaws are pivoted together directly and permanently on a single axis, that the gripping chain is permanently attached at one end to the connected jaws, and that the clamping bolt is permanently carried by one of the jaws and is adapted to be detachably connected with the other jaw and with the free end of the chain. As a result of this construction and arrangement of the parts, the device becomes in effect a unitary structure in which all of the parts are connected together, and being handled, applied to and removed from the wheel in this form, there is no liability of the loss or displacement of any of the coöperating parts, and the application of the device to the wheel can be made with great rapidity and ease.

In applying the device to the wheel, the free end of the chain is held in the left hand and the connected clamp passed over and around the tire to carry the chain across the tread, and the jaws of the clamp are opened and applied to the spoke. The clamping bolt is passed through a link on the free end of the chain and then engaged with the slotted jaw, and finally the wing nut is turned up to clamp the jaws firmly together on the spoke. In removing the device the wing nut is unscrewed to release the clamp, and the clamping bolt is disengaged from the chain and jaw, and the clamp passed back over the tire. In these operations it is but necessary to manipulate a single clamping bolt, which fact aids greatly in the application of the device both as to the time required and the facility of operation. It is seen therefore that the application and removal of the device is attended with little trouble and can be accomplished with the greatest dispatch, a consideration of great importance and advantage in connection with the conditions of use of non-skid devices.

Figure 2:
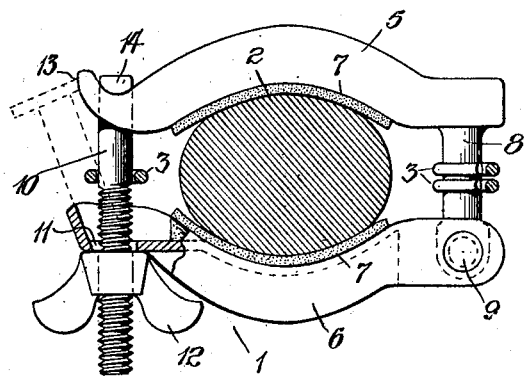
Fig. 2 is a horizontal sectional plan view on the line 2—2 of Fig. 1.
Figure 3:
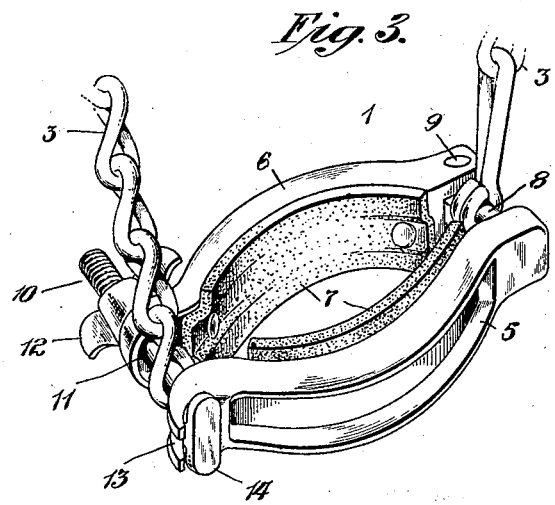
Fig. 3 is a perspective view of the device removed from the wheel.
Figure 4:
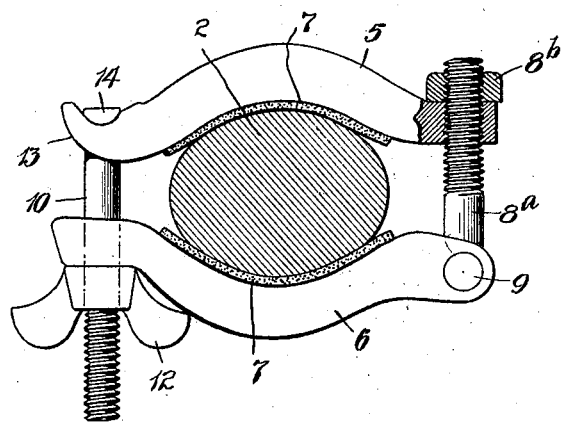
Fig. 4 is a plan view of a modified form of the device.

Instead of connecting the lateral extension 8 of the jaw 5 integrally therewith as shown in Fig. 2, this extension may be connected adjustably in fixed relations to the jaw as shown in Fig. 4 thereby adapting the clamp for application to wide variations in the diameters of the spokes. On reference to Fig. 4 it will be seen that the extension $8^a$ is exteriorly threaded and screwed into a threaded opening in the end of the jaw and firmly and fixedly confined in position by means of a lock nut $8^b$ screwed on the outer end of the extension and bearing against the outer side of the jaw. The extension $8^a$ in this instance as in the other instance described, constitutes a fixed extension on one of the jaws to which the other jaw is pivoted, but in this instance the extension is adjustable relatively to the jaw to which it is attached.

On reference to Fig. 2 it will be seen that by connecting the chain at its end respectively to the extension 8 and the clamping bolt, the points of connection of the chain with the clamp is brought into a plane extending centrally of the spoke. Due to this fact the pull on the chain will be exerted at a point centrally of the clamping surfaces of the clamp, thereby distributing the strain on the spoke evenly and preventing injury to the spoke.

While in the foregoing description and accompanying drawings I have set forth my invention in the particular detailed form which I prefer to adopt and which in practice has been found to answer to satisfactory degree the ends to be attained, it will be understood that these details may be variously changed and modified without departing from the limits of the invention; and it will be further understood that the invention is not limited to any particular form or construction of the parts except in so far as such limitations are specified in the claims.

Having thus described my invention what I claim is:

1. An anti-skid device for vehicle wheels comprising a clamp adapted to be fastened to the wheel spoke and consisting of opposing clamping jaws formed respectively with end portions bearing fixed relations to the jaws, said end portions of the jaws being pivotally connected directly together permanently in such manner that in their opening and closing movements the jaws will be confined in a common plane which extends transversely of the spoke, a clamping device acting on the opposite ends of the jaws to draw them together on the spoke, and a gripping element permanently connected at one end to one of said relatively fixed portions and adapted to be detachably connected at its opposite end to said clamping device.

2. An antiskid device for vehicle wheels comprising a clamp adapted to be fastened to the wheel spoke, and consisting of opposed clamping jaws, one of which is provided at one end with a relatively fixed lateral extension to which the corresponding end of the other jaw is permanently pivoted, an adjustable clamping bolt applied to the opposite ends of the jaws and connecting them together adjustably, and a gripping device connected at one end with the clamping bolt and connected at its other end permanently with the lateral extension and adapted to extend across the wheel tire.

3. An anti-skid device for vehicle wheels comprising a clamp adapted to be fastened to the wheel spoke, and a connected gripping element adapted to extend across the wheel tire, said clamp consisting of opposing clamping jaws, a lateral extension applied to the end of one jaw and bearing fixed relation thereto and extending toward the other jaw, said extension being adjustable endwise relatively to its supporting jaw to establish different operative spaced relations of the two jaws and said extension being pivoted permanently to the opposite jaw in such manner that the opening and closing movements of the jaws will be confined to a common plane extending transversely of the spoke, and an adjustable clamping bolt applied to the opposite ends of the jaws and connecting them together adjustably.

4. An antiskid device for vehicle wheels comprising a clamp adapted to be fastened to the wheel spoke, and a connected gripping element adapted to extend across the wheel tire, said clamp consisting of opposing clamping jaws pivotally connected together at one end, the opposite end of one jaw being provided with an opening therethrough and the corresponding end of the other jaw being formed with an open slot, a clamping bolt extending loosely through the opening in the jaw and a clamping nut screwed on the bolt and engaging said jaw, said bolt adapted to extend through the slot in the other jaw and having a head engaging the slotted jaw at opposite sides of the slot; whereby the headed end of the bolt may be detachably engaged with the slotted jaw.

5. An antiskid device for vehicle wheels comprising a clamp adapted to be fastened to the wheel spoke, said clamp consisting of opposing clamping jaws, one of which is provided at one end with a relatively fixed lateral extension to which the other jaw is permanently pivoted, a clamping bolt applied to the opposite end of the jaws to draw them together on a spoke, and a gripping element having one end permanently connected with the said lateral extension and having its other end adapted to be detachably connected with the clamping bolt, said gripping element adapted to extend across the tread of the wheel tire.

6. An anti-skid device for vehicle wheels consisting of a clamp comprising opposing jaws formed respectively with end portions bearing fixed relations to the jaws, said end portions of the jaws being pivotally connected together permanently at one end in such manner that in their opening and closing movements the jaws will be confined in a common plane which extends transversely of the spoke, a single clamping bolt removably connected to the opposite end of one jaw and adapted to be detachably engaged with the other jaw to close said jaws on the spoke, and a gripping element permanently attached to the clamp at its pivoted end and adapted to extend across the wheel tire and be detachably connected with the clamping bolt.

7. An antiskid device for vehicle wheels comprising a clamp adapted to be fastened to the wheel spoke, and a connected gripping element adapted to extend across the wheel tire, said clamp consisting of opposing clamping jaws, a lateral extension on the end of one of the jaws screwed therein so as to be adjustable and pivotally connected to the corresponding end of the other jaw, means for holding said extension fixedly in its adjusted position, and a clamping bolt applied to the opposite ends of the jaws to force the jaws together on the spoke.

In testimony whereof, I have affixed my signature hereto.

WILLIAM H. CRANE.